United States Patent
Schmalz et al.

(10) Patent No.: US 6,382,692 B1
(45) Date of Patent: May 7, 2002

(54) VACUUM GRIPPER

(75) Inventors: Kurt Schmalz, Dornstetten; Thomas Eisele, Fluorn-Winzeln; Hans Dittmann, Glatten, all of (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 09/539,702

(22) Filed: Mar. 31, 2000

(30) Foreign Application Priority Data

Apr. 6, 1999 (DE) ..................... 299 05 951 U

(51) Int. Cl.⁷ ................................ B25J 15/06
(52) U.S. Cl. ................................... 294/64.1
(58) Field of Search ............... 294/64.1, 65; 269/21; 901/40

(56) References Cited

U.S. PATENT DOCUMENTS

| 2,853,333 A | * | 9/1958 | Littel | 294/64.1 |
|---|---|---|---|---|
| 3,005,652 A | | 10/1961 | Helm | |
| 3,062,746 A | * | 11/1962 | Oakes | 294/64.1 |
| 3,152,828 A | * | 10/1964 | Lytle | 294/64.1 |
| 3,195,941 A | | 7/1965 | Morey | |
| 3,240,525 A | * | 3/1966 | Wood | 294/64.1 |
| 3,330,589 A | * | 7/1967 | Mumma | 294/64.1 |
| 3,926,466 A | * | 12/1975 | Carpenter | 294/64.1 |
| 5,611,585 A | * | 3/1997 | Lingell | 294/64.1 |

FOREIGN PATENT DOCUMENTS

| CH | 374154 | * | 2/1964 | |
| JP | 177571 | * | 7/1993 | 294/64.1 |
| SU | 148889 | * | 1/1962 | |

* cited by examiner

Primary Examiner—Johnny D. Cherry
(74) Attorney, Agent, or Firm—Paul Vincent

(57) ABSTRACT

An elastic vacuum body of a vacuum gripper 10 for suctioning workpieces comprises a sealing lip 22 defining a vacuum chamber 26 at a side of the vacuum body 20 facing the workpiece. The vacuum chamber 26 is flow-connected to a vacuum supply and ribs 36, 38, 40 project into the vacuum chamber 26. The sealing lip 22 comprises at least one groove 28 on its surface 30 facing the vacuum chamber 26. The vacuum body can hold oily objects without slippage. Sheet metal is securely held without distorted bending.

13 Claims, 2 Drawing Sheets

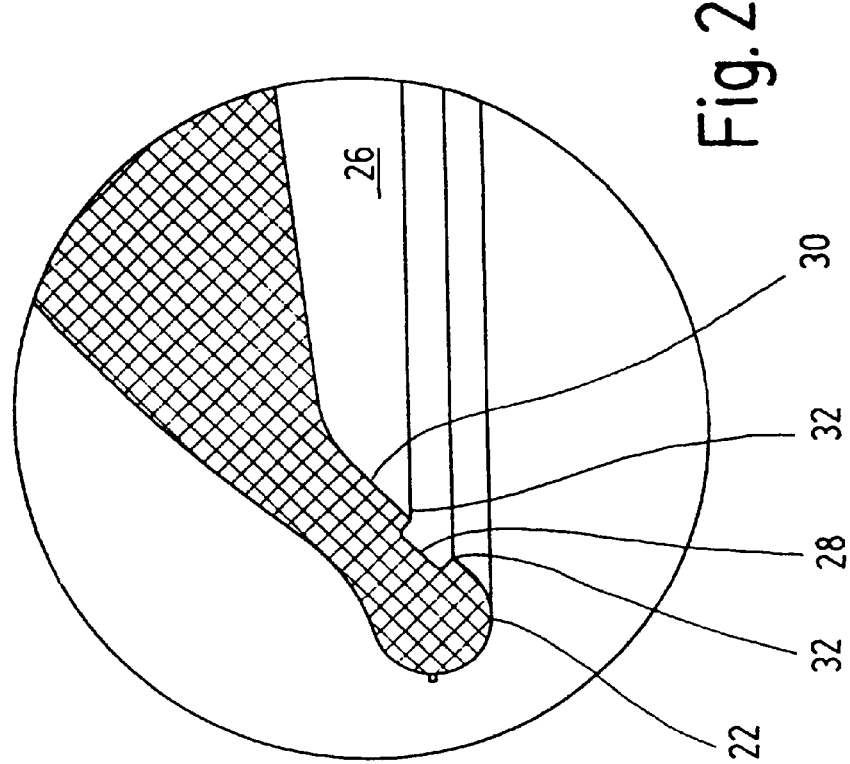
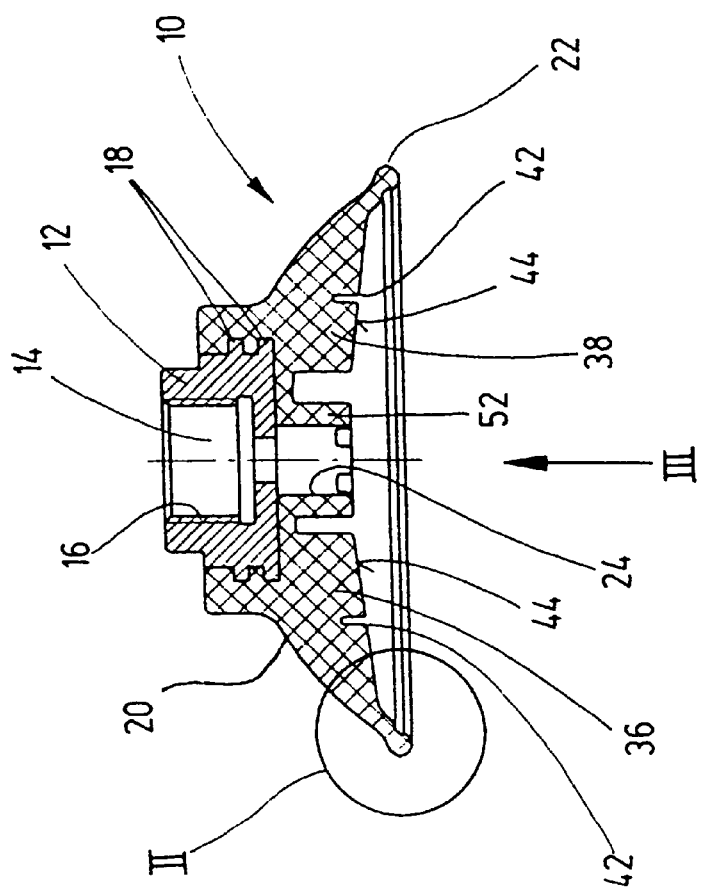

VACUUM GRIPPER

This application claims Paris Convention priority of DE 299 05 951.0 filed Apr. 6, 1999 the complete disclosure which is hereby incorporated by reference.

BACKGROUND OF THE INVENTION

The invention concerns a vacuum gripper for suctioning workpieces, comprising a vacuum supply, an elastic vacuum body and a vacuum body holder, wherein the side of the vacuum body facing the workpiece comprises a sealing lip defining a vacuum chamber, the vacuum chamber being connected to the vacuum supply.

Vacuum grippers are used to suction objects or workpieces such that they can either be fixed or handled. The suctioned object can be transported by disposing the vacuum grippers on manipulators. Different objects require different corresponding vacuum grippers. The vacuum grippers are usually adapted to the size and weight of the object to be manipulated. The vacuum grippers usually comprise a continuous sealing lip closing a vacuum chamber or sealing it off with respect to the surroundings. This enables relatively simple gripping and transport of flat objects, such as metal sheets or glass plates. Metal sheets have the associated problem that they tend to slip with respect to the vacuum gripper, since the surface of the metal sheet is oily. This can, under certain conditions cause production delays and, in the worst case, a production stoppage. Large and therefore heavy metal sheets require vacuum grippers with relatively large surfaces which can disadvantageously deform the metal sheets when holding the sheets under vacuum. Such deformations are unacceptable with thin metal sheets of a sheet thickness of less than 1 mm, as are primarily used in construction of motor vehicle bodies.

It is therefore the underlying purpose of the invention to provide a vacuum gripper which effects reliable gripping and gentle treatment of the workpieces.

SUMMARY OF THE INVENTION

This object is achieved in accordance with the invention with a vacuum gripper of the above mentioned type by providing the vacuum chamber with ribs projecting into the vacuum chamber and by providing the ribs and/or the sealing lip with at least one groove on its side facing the vacuum chamber.

In a further development, the side of the sealing lip facing the vacuum chamber comprises a groove extending in the circumferential direction and the vacuum chamber is provided with radially extending ribs projecting into the vacuum chamber.

The groove extending in the circumferential direction on the surface of the sealing lip facing the vacuum chamber largely prevents slippage of the object suctioned by the vacuum gripper. This groove can be designated as an oil groove in which an oil film can accumulate or into which the oil film is displaced by the abutting sealing lip. Moreover, the groove produces two sharp sealing edges on the sealing lip which help to prevent slippage.

A further advantage of the vacuum gripper in accordance with the invention is that it comprises ribs projecting into the vacuum chamber which limit the depth of the vacuum chamber to thereby prevent e.g. a metal sheet from being suctioned too far into the vacuum chamber. After suctioning, the metal sheet abuts on the projecting ribs, which prevent deformation of the metal sheet by further suctioning.

A further development provides that the groove extends along the entire circumference of the sealing lip. The groove may or may not thereby comprise interruptions. Moreover, the groove can be flow-connected to the vacuum chamber.

The radially extending ribs projecting into the vacuum chamber preferably have differing lengths and widths. Thereby, e.g. four or eight long and wide ribs can be provided which are evenly distributed about the circumference, wherein shorter and narrower ribs are disposed between these long and wide ribs. The remaining spaces can be provided with even shorter and narrower ribs. The ribs are formed as bridges and comprise parallel longitudinal sides and longitudinal edges. In another embodiment, the ribs can be wedge-shaped, wherein their broader end extends radially outwardly such that the free spaces between the ribs are reduced in size.

In a further development, the ribs comprise a flat abutment surface for the workpiece. Preferably, this abutment surface is profiled or provided with recesses. These profiles or recesses function as oil grooves to prevent slippage of the suctioned object, wherein the ribs support the object.

An advantageous embodiment provides that the grooves extend at an angle with respect to the radial and circumferential directions. This produces sharp edges extending at an inclined angle with respect to the longitudinal direction of the ribs or to the travel of the associated section of the oil groove provided in the sealing lip. This produces optimum support, e.g. of an oily metal sheet, on the vacuum gripper.

One side of the grooves is open to withdraw oil entering the grooves. This has the advantage that the oil which is displaced from the surface of the metal sheet when the metal sheet abuts on the abutment surface of the ribs can enter the grooves and exit through the one-sided open end.

In a further development, the vacuum gripper comprises a central annular rib whose abutment surface has recesses. This central annular rib prevents loading of the metal sheet in those areas from which air is suctioned in the vacuum chamber but which are not provided with radial ribs. Air is suctioned from the vacuum chamber via the recesses provided in the radial direction in the annular rib.

Preferably, the radially extending ribs and the annular rib are separated from one another. This permits air to be easily suctioned from all areas of the vacuum chamber to guarantee fast suctioning of the workpiece and secure support of the suctioned workpiece.

Further advantages, features and details of the invention can be extracted from the dependent claims and the following detailed description of a particularly preferred embodiment with reference to the drawing. The features shown in the drawing, recited in the claims, and given in the description may thereby be essential to the invention either individually or collectively in any arbitrary combination.

BRIEF DESCRIPTION OF THE DRAWING

FIG. 1 shows a cross-section through the vacuum gripper according to section I—I of FIG. 3;

FIG. 2 shows an enlarged view of a section II in accordance with FIG. 1; and

DESCRIPTION OF THE PREFERRED EMBODIMENT

Figure 3:
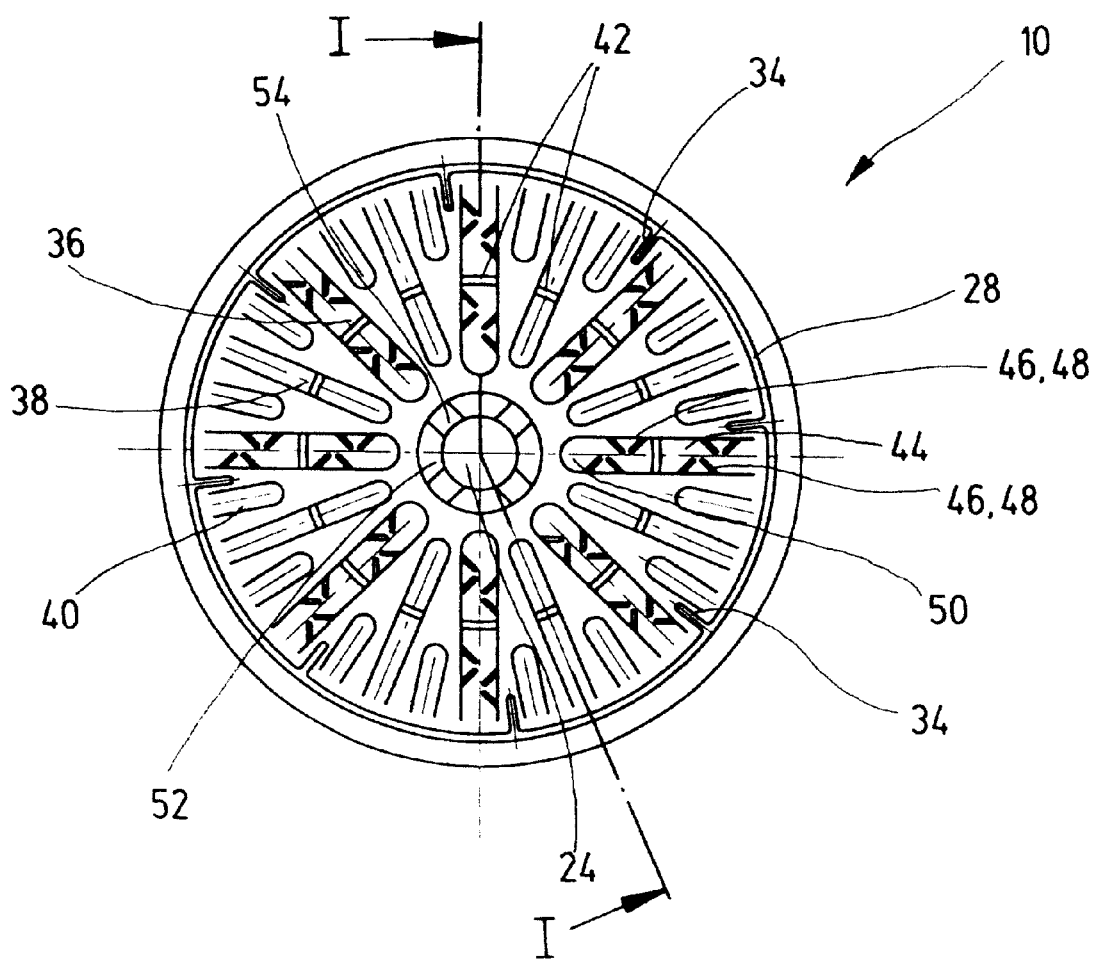
FIG. 3 shows a view in the direction of the arrow III onto the suction side of the vacuum gripper in accordance with FIG. 1.

FIG. 1 shows a cross-section through a vacuum gripper, generally designated with 10. Reference numeral 12 designates a vacuum body holder. It comprises a vacuum supply 14 having e.g. an internal thread 16. The outside of the vacuum body holder 12 is provided with two annular collars 18 to which an elastic vacuum body 20 is securely mounted. This vacuum body 20 is approximately bell-shaped and comprises a continuous lower edge formed as a sealing lip 22. The vacuum body 20 also has a central breakthrough 24 which communicates with the vacuum supply 14.

FIG. 2 is a section II of FIG. 1, providing an enlarged illustration of the sealing lip 22. This sealing lip 22 comprises a circumferential groove 28 facing the vacuum chamber 26 which is open in the direction of the vacuum chamber 26. This circumferential groove 28 is disposed on the surface 30 facing the vacuum chamber 26 and has an approximately rectangular cross-section. The circumferential groove 28 also has two sharp edges 32 defining the circumferential groove 28.

FIG. 3 shows a view III of the lower side of the vacuum gripper 10 in accordance with FIG. 1. The center of the vacuum gripper 10 clearly shows the breakthrough 24 through which the air is suctioned off from the vacuum chamber 26. The circumferential groove 28 has radially inwardly extending groove sections 34 disposed at regular intervals. A plurality of radially extending ribs 36, 38 and 40 project into the vacuum chamber 26.

FIG. 1 shows a section I—I through a rib 36 and a rib 38. The height of the ribs 36 and 38, extending from the sealing lip 22, increases in the direction of the breakthrough 24. The ribs 36 and 38 are also provided with transverse bores 42 extending in the circumferential direction.

Each of the ribs 36, 38 and 40 comprises an abutment surface 44 on which the suctioned workpiece can be supported. The support surface of the rib 36 has recesses 46 in the shape of grooves 48 (clearly shown in FIG. 3). Each groove 48 is disposed at any angle with respect to the longitudinal axis 50 of the respective ribs 36 which is not equal to 90°. This produces a profiled abutment surface 44.

As seen in FIGS. 1 and 3, the breakthrough 24 is surrounded by an annular rib 52. The height of this rib 52 corresponds approximately to the height of the ribs 36 at their radial inner ends. Moreover, the annular rib 52 has recesses 54 extending in a radial direction.

When the vacuum gripper 10 in accordance with the invention suctions a workpiece, e.g. a metal sheet, the circumferential groove 28 of the sealing lip 22 abuts on the surface of the metal sheet in a sealing manner. If the surface has been oiled or lubricated, the oil is displaced into the circumferential groove 28 to safely prevent displacement of the metal sheet on the vacuum gripper 10. Moreover, when the metal sheet is suctioned, the vacuum gripper 10 is deformed such that the abutment surfaces 44 of the ribs 36, 38, 40 and 52 abut on the surface of the metal sheet. The grooves 48 also serve as oil grooves and prevent additional displacement of the metal sheet. The ribs 36, 38, 40 and 52 prevent deformation of the suctioned metal sheet, since the vacuum gripper 10 is essentially flat in the area of the abutment surfaces 44 when suctioned on the metal sheet or the workpiece. The air is suctioned off from each area of the vacuum chamber 26 via the spaced apart ribs 36, 38, 40 and 52 and the grooves 42 and 54. Vacuum is also present in the circumferential groove 28 due to the grooved sections 34.

We claim:

1. An elastic vacuum body for a vacuum gripper, the vacuum gripper for suctioning a workpiece, the vacuum gripper having a vacuum body holder communicating with a vacuum supply, the vacuum body being mounted to the vacuum body holder, the elastic vacuum body comprising:

a sealing lip defining a vacuum chamber, said lip disposed at a side of the vacuum body facing the workpiece, said sealing lip having a lip groove on a surface facing said vacuum chamber;

means defining an opening for flow communication of said vacuum chamber to said vacuum supply; and ribs disposed on said side of the vacuum body facing the workpiece, said ribs extending into a central portion of said vacuum chamber, wherein said ribs have rib grooves on sides facing said vacuum chamber.

2. The vacuum body of claim 1, wherein said lip groove extends along a circumference of said sealing lip.

3. The vacuum body of claim 2, wherein said lip groove extends, without interruption, throughout said circumference.

4. The vacuum body of claim 1, wherein said ribs have at least one of differing lengths and differing widths.

5. The vacuum body of claim 1, wherein said ribs comprise substantially flat rib abutment surfaces for the workpiece.

6. The vacuum body of claim 5, wherein said rib abutment surfaces have surface structures.

7. The vacuum body according to claim 6, wherein said surface structures have rib recesses.

8. The vacuum body of claim 7, wherein said rib recesses extend at angles with respect to a radial and longitudinal axis of said ribs and with respect to a circumferential direction of said sealing lip.

9. The vacuum body of claim 7, wherein in said rib recesses are open on one side.

10. The vacuum body of claim 1, further comprising a central annular member having an annular abutment surface for the workpiece, said annular abutment surface having recesses.

11. The vacuum body of claim 10, wherein said annular abutment surface recesses extend in a radial direction.

12. The vacuum body of claim 10, wherein said annular member is disposed at a separation from said ribs.

13. The vacuum body of claim 1, wherein said ribs extend in a radial direction.

* * * * *